(12) United States Patent
Estes

(10) Patent No.: US 7,751,916 B2
(45) Date of Patent: Jul. 6, 2010

(54) CLOSED LOOP ANALOG SIGNAL PROCESSOR ("CLASP") SYSTEM

(75) Inventor: Christopher A. Estes, Nashville, TN (US)

(73) Assignee: Endless Analog, Inc., Nashville, TN (US)

( * ) Notice: Subject to any disclaimer, the term of this patent is extended or adjusted under 35 U.S.C. 154(b) by 716 days.

(21) Appl. No.: 11/467,523

(22) Filed: Aug. 25, 2006

(65) Prior Publication Data
US 2007/0050062 A1   Mar. 1, 2007

Related U.S. Application Data

(60) Provisional application No. 60/711,576, filed on Aug. 26, 2005.

(51) Int. Cl.
G06F 17/00 (2006.01)
H04B 1/00 (2006.01)
G11B 27/22 (2006.01)

(52) U.S. Cl. .................. 700/94; 381/119; 369/47.36

(58) Field of Classification Search .................. 700/94, 700/73; 381/119; 360/7, 8, 13, 17, 25, 31, 360/32, 51, 52, 61–64, 73, 79; 369/47.36
See application file for complete search history.

(56) References Cited

U.S. PATENT DOCUMENTS

| | | | | |
|---|---|---|---|---|
| 3,559,861 A | * | 2/1971 | Knox | 226/168 |
| 3,573,390 A | * | 4/1971 | Frost et al. | 360/17 |
| 3,645,539 A | * | 2/1972 | Jenkins | 360/7 |
| 3,685,031 A | | 8/1972 | Cook | |
| 3,705,272 A | * | 12/1972 | Tsuji et al. | 360/62 |
| 3,757,058 A | * | 9/1973 | Ingoldsby | 360/7 |
| 3,877,338 A | * | 4/1975 | David | 84/453 |

(Continued)

FOREIGN PATENT DOCUMENTS

GB     2072926 A  * 10/1981

OTHER PUBLICATIONS

Huber, David Miles and Robert E Runstein, "Modern Recording Techniques", Elsevier, Sixth Edition, pp. v-xvi, 187-213, and 299-346.*

(Continued)

*Primary Examiner*—Vivian Chin
*Assistant Examiner*—Daniel R Sellers
(74) *Attorney, Agent, or Firm*—Wood, Herron & Evan, LLP

(57) ABSTRACT

A system, apparatus, device, and method for recording sounds and music with the character and sonic benefits of a genuine analog tape recording is disclosed. More specifically, an electro-mechanical-software controlled closed loop analog signal processor ("CLASP") system, which is comprised of a digital audio workstation ("DAW") resident on a host computer and is in operable communication with a CLASP unit or device is disclosed. The CLASP unit, which contains firmware, is also in operable communication with a tape recorder transport which is comprised of a tape mechanism transport and a control unit. In one embodiment, an analog audio signal is recorded on an analog tape and then immediately played back and routed to the DAW via an analog to digital converter, thus providing for digitally recorded analog audio. Typically, after the analog recorded signal is played back, it is erased from the tape which generally continues to cycle.

28 Claims, 2 Drawing Sheets

U.S. PATENT DOCUMENTS

| | | | |
|---|---|---|---|
| 4,011,592 A * | 3/1977 | Kawada | 360/130.31 |
| 4,211,997 A * | 7/1980 | Rudnick et al. | 714/758 |
| 4,460,931 A | 7/1984 | Takeuchi | |
| 5,467,288 A | 11/1995 | Fasciano et al. | |
| 5,559,962 A | 9/1996 | Okamura et al. | |
| 5,596,646 A | 1/1997 | Waller, Jr. et al. | |
| 5,600,756 A | 2/1997 | Ely | |
| 5,634,020 A | 5/1997 | Norton | |
| 5,802,182 A | 9/1998 | Pritchard | |
| 5,842,014 A | 11/1998 | Brooks et al. | |
| 5,883,804 A | 3/1999 | Christensen | |
| 6,009,507 A | 12/1999 | Brooks et al. | |
| 6,072,796 A | 6/2000 | Christensen et al. | |
| 6,084,569 A | 7/2000 | Ricotta et al. | |
| 6,086,620 A * | 7/2000 | Oliver et al. | 703/13 |
| 6,128,681 A | 10/2000 | Shephard | |
| 6,134,379 A | 10/2000 | LaMacchia | |
| 6,144,798 A * | 11/2000 | Nagasawa et al. | 386/52 |
| 6,212,197 B1 | 4/2001 | Christensen et al. | |
| 6,271,829 B1 | 8/2001 | Ricotta et al. | |
| 6,285,518 B1 * | 9/2001 | Zweighaft | 360/25 |
| 6,314,403 B1 | 11/2001 | Jeffery | |
| 6,356,178 B1 * | 3/2002 | Isozaki | 386/109 |
| 6,393,198 B1 | 5/2002 | LaMacchia | |
| 6,507,658 B1 | 1/2003 | Abel et al. | |
| 6,592,245 B1 | 7/2003 | Tribelsky et al. | |
| 6,664,913 B1 | 12/2003 | Craven et al. | |
| 6,784,812 B2 | 8/2004 | Craven et al. | |
| 6,829,017 B2 | 12/2004 | Phillips | |
| 6,870,936 B1 | 3/2005 | Ajamian | |
| 6,891,482 B2 | 5/2005 | Craven et al. | |
| 7,256,962 B2 * | 8/2007 | Tateishi | 360/121 |
| 7,382,966 B2 * | 6/2008 | Kobayashi et al. | 386/65 |
| 2007/0039449 A1 * | 2/2007 | Redmann | 84/609 |
| 2007/0136782 A1 * | 6/2007 | Ramaswamy et al. | 725/138 |

OTHER PUBLICATIONS

Barnes & Nobles, "Modern Recording Techniques", search.barnesandnoble.com, print page version, pp. 1-2. http://search.barnesandnoble.com/booksearch/pfp.asp?ean=9780240806259.*

Roland, "Chorus Echo RE-301 Instructions", Jul. 1979, Roland, Printed in Japan, pp. 1-7.*

* cited by examiner

CLOSED LOOP ANALOG SIGNAL PROCESSOR ("CLASP") SYSTEM

RELATED APPLICATION

This application claims priority to Application 60/711,576 filed Aug. 26, 2005, entitled CLOSED LOOP ANALOG SIGNAL PROCESSOR "CLASP", now pending, which is incorporated by reference herein.

FIELD OF THE INVENTION

The present invention relates to sound recording devices in general and, more particularly, to analog tape audio recording devices.

BACKGROUND OF THE INVENTION

Today many, if not most, professional or semi-professional sound, music, or like audio recordings are recorded and produced digitally. In that process, recording engineers typically use an audio digital audio workstation ("DAW"). However, despite the now nearly ubiquitous presence of digital recordings, music, and audio files, many artists, musicians, recording engineers, music producers, and audiophiles still prefer the sound of analog tape recordings over digital recordings because of the warmth and character of the analog tape recordings.

Although there is a desire for the sound of analog recordings, there are a number of limitations that typically discourage any attempt to use a traditional multi track analog tape recording system in combination with a DAW. First, many engineers and producers find that attempting to synchronize a traditional analog tape machine to a DAW to be problematic. For example, some of the problems engineers may encounter when trying to use analog tape machines in conjunction with a DAW include:

(1) Using the Society of Motion Picture and Television Engineers (SMPTE) time code to synchronize the DAW with the tape machine. This sacrifices one of the tape tracks and wastes time waiting for the two devices to synchronize.

(2) Constant rewinding and fast forwarding of the analog tape machine. This takes time away from a session and hurts creative work flow.

(3) Having to transfer the analog tape recorded tracks into the DAW for editing. This is time consuming and breaks the creative work flow.

(4) Big bulky and expensive analog recording machines. Many studios are in people's homes now where space is limited and large format analog recorders are still very expensive.

In short, because of the difficulties of using a standard multi track analog tape recording system with a DAW, many engineers typically resort to using only a DAW to do all of their recording. In other words, engineers and producers sacrifice the warmth and pleasing sound of classic analog tape for the convenient but characterless and thin sound of digital recording.

OBJECTS OF THE INVENTION

It is therefore an object of the invention to allow engineers, music producers, and like personnel to record sounds and music with the character of a genuine analog tape recording. It is also an object of the invention to record music and sounds with the quality of an analog tape recording without the existing hassles and limitations currently involved in using a DAW. It is yet another object of the invention to provide a system and/or components therefore that will allow engineers, music producers, as well as hobbyist, home users, audio enthusiasts, or amateurs to achieve the coveted sound of analog recordings while utilizing at least some of their present studio or recording and processing equipment.

SUMMARY OF THE INVENTION

A system, apparatus, device, and method for recording sounds and music with the character and sonic benefits of a genuine analog tape recording is disclosed. More specifically, an electro-mechanical-software controlled closed loop analog signal processor ("CLASP") system, which is comprised of a digital audio workstation ("DAW") resident on a host computer and is in operable communication with a CLASP unit or device and software is disclosed. The CLASP unit, which contains firmware, is also in operable communication with a tape recorder transport which is comprised of a tape mechanism transport and a control unit. In one embodiment, an analog audio signal is recorded on an analog tape, which may be in the form of an endless loop or a reel-to-reel configuration, and then immediately played back and routed to the DAW via an analog to digital converter, thus providing for digitally recorded analog audio. Typically, after the analog recorded signal is played back, it is erased from the tape which generally continues to cycle.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF THE INVENTION

Figure 1:
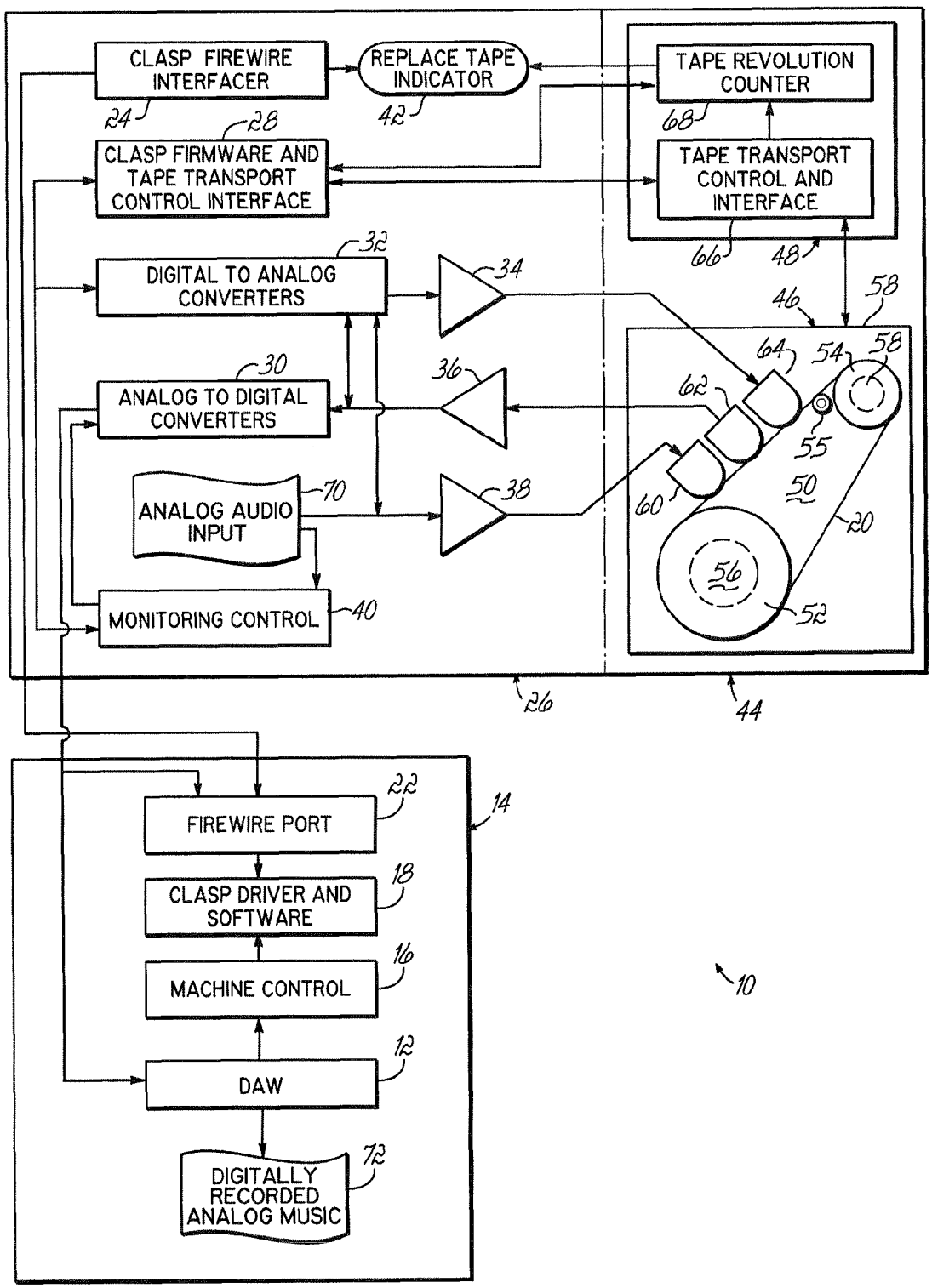
FIG. 1 is a schematic drawing of one embodiment of the present invention.

FIG. 1 illustrates one embodiment of a closed loop analog signal processor ("CLASP") system 10 of the present invention. As illustrated, the system 10 utilizes a digital audio workstation ("DAW") 12 resident on a host computer 14. Examples of DAWs that might be utilized include, but are not limited to, the Pro Tools|HD® systems by Digidesign®, a division of Avid Technology, Inc., located at 2001 Junipero Serra Boulevard, Daly City, Calif. 94014-3886, or Nuendo by Steinberg Media Technologies GmbH. Other DAWs known to those skilled in the art may also be used in accordance with the principles of the present invention. The host computer 14 may be a standard personal computer ("PC") or a specially made or adapted computer, processor, or workstation. Also, the components and functions of the host computer 14 could in alternative embodiments be spread out, dispersed, or located on multiple machines, and those machines could be located in multiple geographically dispersed locations.

The host computer 14 also contains a machine control 16 which is in operable communication with the DAW 12 and provides control to the host computer 14. The machine control 16 also allows for a user to interface with the host computer 14 and the DAW 12 software. For example, a user will typically interact with the DAW 12 via the host computers 14 keyboard, mouse, and/or monitor.

As illustrated, the host computer 14 will also typically contains a CLASP driver and software 18. The CLASP driver software 18 provides a graphic user interface ("GUI") on the display monitor of the DAW host computer 14. This GUI typically will show the user both peak and volume unit ("VU") style level meters for a tape 20 record and playback levels. There will also typically be indicators showing tape 20 usage and calibration settings. Tape 20 speed is also controlled via the software 18. Other features such as tape 20 noise reduction and variable speed control may also be included. The CLASP driver software 18 will also typically control the monitoring options for the CLASP system 10. For example, the CLASP driver software 18 will typically allow users to monitor pre-recorded sounds and post-recorded sounds while recording or tracking those sounds. The user will be able to select these, and other features, from a GUI menu. Additionally, the CLASP driver software 18 will allow an artist, musician, or the like recorder to monitor the pre-recorded sounds while the post-recorded analog sounds, which have been converted to a digital signal, are being digitally recorded in the DAW. The CLASP software 18 allows this monitoring to be done with no delay, feedback, or other tape artifacts.

The host computer 14 has an interface 22 to allow it to operably communicate with a corresponding interface 24 in a CLASP unit or device 26. As illustrated, these interfaces 22, 24 are firewire ports, but other interfaces, connections, or ports may also be utilized. For example, a Universal Serial Bus ("USB") port could also be used to operably connect the host computer 14 with the CLASP unit 26.

While a single CLASP unit 26 is illustrated, in practice, multiple CLASP units 26 may be used together. For example, additional CLASP devices 26 may be added to the system 10 to provide additional tracks per unit. Typically, each CLASP unit 26 will provide eight discrete audio tracks for analog tape signal processing. Accordingly, if a user wanted up to 16 tracks, two CLASP units 26 would be used in unison. Likewise if 24 tracks were desired, three CLASP units 26 would be used. Each CLASP device 26 would be configured to automatically daisy chain together and are thereby in operable communication with the DAW host computer 14. The CLASP driver software 18 recognizes each unit individually, displays information for each unit 26, and simultaneously synchronizes all the CLASP devices 26.

Typically the CLASP unit 26 will be a rack unit or a rack mounted unit, however, it may equally be configured so as to be a stand alone unit, capable of resting on a table, the floor, or other support structure. When rack mounted, each CLASP device 26 is typically housed in a standard nineteen inch rack that utilizes very little space and provides for silent operation. Also, while the DAW host computer 14 and the CLASP unit 24 will generally be located in the same vicinity, like in the same recording studio or room, these components could also be physically separated, either in different parts of a room, different rooms of building, or even in different geographical locations.

The CLASP unit 26 typically includes a CLASP firmware and tape transport control interface 28. The firmware or microprogram 28 is typically stored in the read only memory ("ROM") of the CLASP unit 26. The CLASP unit 24 also typically contains an analog to digital ("A/D") converter, a digital to analog ("D/A") converter, various amplifiers 34, 36, 38, a monitoring control 40, and other components or circuitry known to those skilled in the art. The CLASP unit 26 may also contain a replace tape indicator 42, however this indicator 42 could also reside in another part of the system 10, for example in the GUI of the CLASP software 18 on the host computer 14.

As illustrated, the CLASP unit 26 is in operable communication with a tape recorder transport unit 44. As illustrated, the tape recorder transport unit 44 is further comprised of a tape mechanism transport 46 and a control unit 48. The tape recorder transport unit 44, the tape mechanism transport 46, and the control unit 48 may be configured as separate components, or may be integrated together. For example the tape recorder transport unit 44 or the tape mechanism transport 46 may be internal or part of the CLASP unit 26, or may exist as external components, separate and apart from the CLASP unit 26. In a configurations where the tape recorder transport 44 is an external component, a reel-to-reel multi track tape recorder such as is known to those skilled in the art (e.g., Otari Model No. MTR-90 MKII 2, available at Otari, 4-33-3 Kokuryo-cho Chofu-shi Tokyo 182-0022 Japan, Studer Model No. A-827, available at Studer, Althardstrasse 30 CH-8105 Regensdorf Switzerland, or the like) could be configured to be operably controlled by a Musical Instrument Digital Interface ("MIDI") machine control protocol, a Sony 9 pin control protocol, or a like control protocol to interface with the CLASP unit 26.

Figure 2:
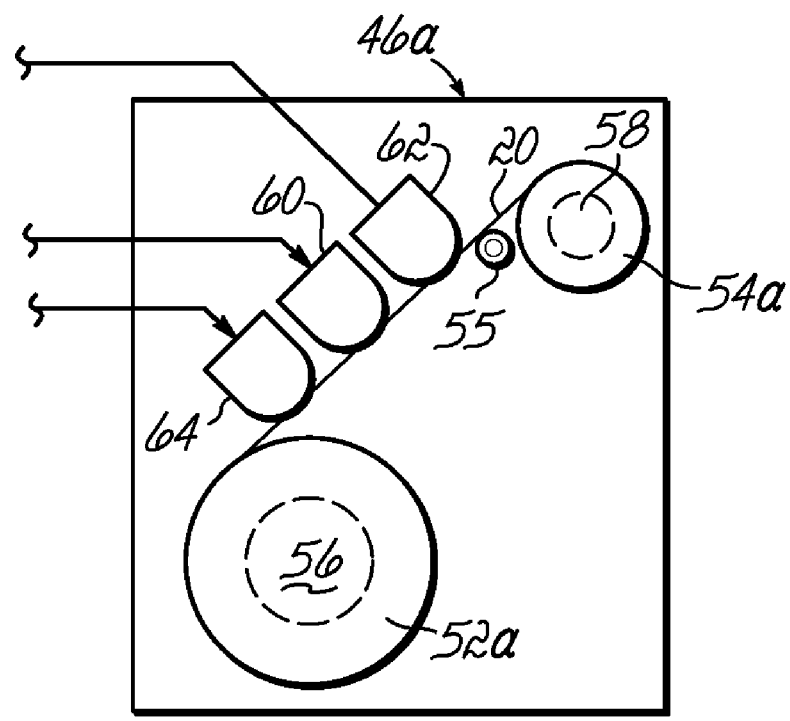
FIG. 2 is a schematic drawing of part of the system shown in FIG. 1 which may be used in an alternative embodiment of the present invention.

The tape mechanism transport 46 may be a standard transport mechanism known to those skilled in the art. For example, in one embodiment, the transport mechanism used with a Video Home System ("VHS") tape might be utilized. In other words, the analog audio tape 20 may be fashioned in a video cassette type of tape cartridge, but the tape will be adapted or formulated for analog or optimal analog audio recording. The tape 20 is typically housed in a removable cartridge for easy tape exchange. Typically, the tape will be a half inch in width, but other sizes may also be used. For example, if a cassette tape format was used, the tape would have a width of about an eighth of an inch. The tape may be in the form of an endless loop 50 cartridge that loops around two reels 52, 54, or a standard reel-to-reel 52a, 54a cartridge, as shown in FIG. 2. In embodiments where the tape mechanism transport 46a uses a non-endless loop tape, an endless tape loop effect may also be achieved by using two or more sets of tapes or tape cartridges. In other words, while one tape was recording or standing by to record, the other tape would be rewinding to allow for it to begin recording when the first tape was full. Multiple tape mechanism transports 46a would be unitized and synchronized to allow for a seamless recording experience. If a recorded tape was desired to be kept for archival or other purposes, a user may be prompted to replace that tape with a fresh one, while another tape was recording.

The tape mechanism transport 46 has a capstan motor 55 which pulls the tape 20 over the tape heads 56, 58 and is controlled by the CLASP driver software 18 via standard a MIDI machine control protocol, a Sony 9 pin control protocol, or a like control protocol. Such a protocol is found standard in most all DAW recording systems 12.

The tape recorder transport unit 44 also has stationary or rotary heads 60, 62, 64 which are operationally in contact with the tape 20. As illustrated, there is a separate record head 60, playback or reproduction ("repro") head 62, and erase head 64, however, one or more of these heads 60, 62, 64 could be configured into a single head. The tape recorder transport unit 44 will also have other components and circuitry known to those skilled in the art.

The control unit 48, as illustrated, is comprised of a tape transport control and interface 66 and a tape revolution counter 68. The control unit 48, and more specifically, the tape transport and interface 66 is in operable communication with the tape mechanism transport 46. The tape transport control and interface 66 is also in operable communication with the CLASP firmware 28 and provides an interface to and control of the tape mechanism transport 46. Also, while the control unit 48 is illustrated as a separate component of the tape recorder transport unit 44, it, or some of its components thereof, could also be located in other places of the system 10. For example, it or some of its components could also be located in the CLASP unit 26.

While the drawing illustrates the inclusion of a tape revolution counter 68 is in the control unit 48, in alternative embodiments, particularly those that do not utilize a closed or endless loop tape configuration, the tape revolution counter 68 may be omitted. Nevertheless, in some embodiments, the tape revolution counter 68, or like counter, may be still be utilized in non-endless tape configurations to monitor when a tape is nearing its end and/or may need to be replaced. In embodiments that use a closed or endless loop tape 20, as illustrated, the tape revolution counter 68 monitors the revolutions or rotations of the tape 20. The tape revolution counter 68 is in operable communication with the CLASP firmware 28 and also with the replace tape indicator 42. Thus, the input from the tape revolution counter 68 to the CLASP firmware 28 is used to determine when to activate the replace tape indicator 42. While the drawings illustrate and it is herein described that the tape revolution counter 68 provides this input to the CLASP firmware 28 by counting the number of rotations or revolutions of the tape 20, other means of determining when the tape 20 should be replaced may also be utilized. For example, a counter could measure the distance the tape 20 has traveled, the amount of time the tape 20 has been in use, the performance of the tape 20, the time since the tape 20 was last changed, or other like methods of monitoring the potential wear on the tape 20. Also the CLASP unit 26 may contain a logic circuit that measures how many times the tape 20 passes over the playback and record heads 60, 62 and tells the user when it is time to replace the tape 20 or clean the tape heads 60, 62, 64 and mechanism 46.

In operation, an incoming analog audio input 70 originates from a microphone or other input source which is adapted to receive, capture, or pickup the sounds desired to be recorded. The analog audio input 70 is then typically routed through the record head amplifier 38 which amplifies the incoming audio signal and passes the signal on to either the stationary or rotary record head 60 which is in operational contact with the tape 20. After the record head 60 records the analog signal onto the tape 20, the playback head 62, located in the illustrated embodiment adjacent to the record head 60, picks up and reads the recorded signal. The playback head signal is then amplified by the playback or reproduction ("repro") head amplifier 36 and passes through an analog to the A/D converter 30. The digital signal is then routed to the DAW 12 located on the host computer 14. A digitally recorded analog music or sound 72 then results from the DAW 12.

During operations, the monitoring control 40 also monitors the analog audio input 70. The monitoring control 40 is in operable communication with the A/D converter 30 and allows a user to thus monitor both the pre-recorded as well as the post-recorded sounds during tracking.

The time delay from the record head 38 to the playback head 40 is calculated and compensated for by computer software communicating with a CLASP software driver 48 running on the DAW host computer 12. This ensures that CLASP over dubbed tracks are time and phase aligned for playback synchronization. This results in an invisible and seamless analog recording experience because the signals just seem to pass through the CLASP device 26 and onto the DAW 12 hard disk recorder.

In a closed or endless tape embodiment, after the tape 20 passes over the playback head 62, it then passes over an erase head 64 that erases the audio that was just recorded on that section of the endless tape 20. The endless loop tape 20 is thus able to be recycled and loop to start the process all over again. Similarly, a non-endless loop tape 20 may also pass over the erase head 64 after the recorded analog audio sound is picked up by the playback head 62. This may be particularly desirable in embodiments where multiple tapes 20 and multiple tape mechanism transports 46a are used in conjunction with one another to simulate an endless loop tape effect. Alternatively, the erase head 64 may be positioned to erase the analog audio tape 20 just prior the tape 20 is being re-recorded. In either case, the erase head 64 allows for one tape 20 to be used to record or be standing by to record while another tape 20 is being prepared to record again.

The system 10 uses industry standard MIDI machine control, Sony 9 pin control, or like control, via the CLASP driver software 18 so that the tape 20 is not in motion unless the DAW 12 is operating with record enabled on any given DAW tracks. This helps to prevent unnecessary tape 20 motion when the user is editing or doing any kind of playback that does not involve recording new audio onto DAW tracks. Hence, this helps to extend the life of the tape 20.

While the present invention has been illustrated by description of various embodiments and while these embodiments have been described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. A system for recording sound comprising:

an analog audio tape;

a record head positioned to operably record sounds on the analog audio tape;

a playback head positioned adjacent to the record head, the playback head adapted to immediately pick up the sounds recorded on the analog audio tape;

an erase head positioned sequentially after the record head and the playback head, the erase head adapted to erase the sounds recorded on the analog audio tape;

a digital audio workstation operably connected to the playback head; and analog audio tape control software adapted to control the movement of the analog audio tape, the recording of sound on the analog audio tape, the recording of playback sound from the analog audio tape in the digital audio workstation, and to compensate for a time delay between analogically recorded sounds and playback sounds.

2. The system of claim 1 wherein the analog audio tape is configured in a cartridge.

3. The system of claim 2 wherein the cartridge is a VHS or cassette tape cartridge.

4. The system of claim 1 wherein the analog audio tape is configured in a closed loop.

5. The system of claim 4 further comprising a tape revolution counter adapted to monitor the revolutions of the closed loop of the analog audio tape.

6. The system of claim 5 further comprising an indicator adapted to indicate when the closed loop analog audio tape should be replaced.

7. The system of claim 1 further comprising a record head amplifier operably connected to the record head.

8. The system of claim 1 further comprising a playback head amplifier operably connected to the record head.

9. The system of claim 1 further comprising an analog to digital converter operably positioned between the playback head and the digital audio workstation.

10. The system of claim 1 further comprising an erase head amplifier operably connected to the erase head.

11. A system for recording sound comprising:
an analog audio tape configured in a cartridge, the analog audio tape having a forward direction of travel;
an audio input device adapted to receive audio signals;
a record head amplifier in operable communication with the audio input device and adapted to amplify the audio signals;
a record head in operable communication with the record head amplifier and positioned to operably record the audio signals on the analog audio tape;
a playback head positioned adjacent to the record head so that the forward direction of travel of the tape causes a particular part of the tape to first pass over the record head before passing over the playback head, the playback head adapted to immediately pick up the audio signals recorded on the analog audio tape;
an erase head positioned sequentially after the record head and the playback head so that the forward direction of travel of the tape causes the particular part of the tape to first pass over the record head, and then the playback head, and then over the erase head, the erase head adapted to erase the audio signals recorded on the analog audio tape;
a playback head amplifier in operable communication with the playback head and adapted to amplify the audio signals;
an analog to digital converter in operable communication with the playback head amplifier;
a digital audio workstation operably connected to the playback head; and
analog audio tape control software adapted to control the movement of the analog audio tape, the recording of sound on the analog audio tape, the recording of playback sound from the analog audio tape in the digital audio workstation, and to compensate for a time delay between analogically recorded sounds and playback sounds.

12. The system of claim 11 wherein the analog audio tape is configured in a closed loop.

13. The system of claim 11 wherein the cartridge is a VHS or cassette tape cartridge.

14. The system of claim 13 wherein the analog audio tape is configured in a closed loop.

15. The system of claim 14 further comprising a tape revolution counter adapted to monitor the revolutions of the closed loop of the analog audio tape.

16. The system of claim 15 further comprising an indicator adapted to indicate when the closed loop analog audio tape should be replaced.

17. A method for digitally recording analog audio sounds comprising:
recording analog sounds on a first analog audio tape while retrieving the recorded analog sounds from the first analog audio tape;
converting the recorded analog audio sounds from the first analog audio tape to a digital signal;
compensating for a time delay between the recording and retrieving of the analog sounds; and
recording the digital signal in a digital audio workstation.

18. The method of claim 17 wherein the first analog audio tape is configured in a closed loop.

19. The method of claim 18 further comprising the step of erasing the analog sounds on the first analog audio tape.

20. The method of claim 17 further comprising the step of providing a second analog audio tape and switching to the second analog audio tape to record thereon after the first analog audio tape is full.

21. A method for digitally recording analog audio tape sounds comprising:
calculating a time delay between a record head of a tape recorder transport unit and the playback head of the tape recorder transport unit;
analogically recording sounds on a tape with the record head;
reading the analogically recorded sounds off the tape with the playback head while analogically recording new sounds on the tape with the record head;
transferring the read sounds from the playback head to a digital audio workstation host computer while continuing to analogically record sounds on the tape with the record head;
compensating for the time delay between the analogically recorded sounds and the read sounds with a software driver running on the digital audio workstation host computer;
synchronizing the time and phase of the analogically recorded sounds and the read sounds; and
saving the synchronized sounds on a digital audio workstation hard disk recorder.

22. The method of claim 21 further comprising the steps of monitoring pre-recorded sounds from a microphone with a monitor control while simultaneously monitoring over dubbed tracks from the digital audio workstation hard disk recorder.

23. The method of claim 21 further comprising the step of simultaneously monitoring pre-recorded sounds and post-recorded sounds.

24. The method of claim 21 further comprising the step of simultaneously monitoring pre-recorded sounds and synchronized post-recorded sounds while synchronistically over dubbing the pre-recorded sounds.

25. A system for recording sound comprising:
an analog recordable medium;
a record head positioned to operably record sounds on the analog recordable medium;
a playback head adapted to pick up playback sounds recorded on the analog recordable medium;
an erase head adapted to erase the sounds recorded on the analog recordable medium;
a digital audio workstation operably connected to the playback head; and
software to compensate for a time delay between analogically recorded sounds and playback sounds.

26. A method for digitally recording analog audio sounds comprising:
- recording analog sounds on a first analog recordable medium while retrieving the recorded analog sounds from the first analog recordable medium;
- converting the recorded analog audio sounds from the first analog recordable medium to a digital signal;
- compensating for a time delay between the recording and retrieving of the analog sounds; and
- recording the digital signal in a digital audio workstation.

27. A method for digitally recording analog audio sounds comprising:
- calculating a time delay between a record head of a recorder and a playback head of a recorder;
- analogically recording sounds on an analog recordable medium with the record head;
- reading the analogically recorded sounds off the analog recordable medium with the playback head while analogically recording new sounds on the analog recordable medium with the record head;
- transferring the read sounds from the playback head to a digital audio workstation while continuing to analogically record sounds on the analog recordable medium with the record head;
- compensating for the time delay between the analogically recorded sounds and the read sounds with a software driver running on the digital audio workstation; and
- synchronizing the time and phase of the analogically recorded sounds and the read sounds.

28. The method of claim 27 further comprising the step of simultaneously monitoring pre-recorded sounds and synchronized post-recorded sounds while synchronistically over dubbing the pre-recorded sounds.

* * * * *

UNITED STATES PATENT AND TRADEMARK OFFICE
CERTIFICATE OF CORRECTION

| | | |
|---|---|---|
| PATENT NO. | : 7,751,916 B2 | Page 1 of 1 |
| APPLICATION NO. | : 11/467523 | |
| DATED | : July 6, 2010 | |
| INVENTOR(S) | : Christopher Estes | |

It is certified that error appears in the above-identified patent and that said Letters Patent is hereby corrected as shown below:

Cover Page, Item 57, Second Column should read – "A system, apparatus, device, and method for...are disclosed."

Col. 1, line 22 should read – "...use a digital audio workstation..."

Col. 2, lines 10-12 should read – "...system, apparatus, devise, and method for...are disclosed."

Col. 4, line 14 should read – "in configurations where the..."

Col. 4, line 52 should read – "...via a standard..."

Col. 5, lines 10-12 should read – "While the drawing illustrates the inclusion of a tape revolution counter in the control unit..."

Col. 5, line 16 should read – "...may still be..."

Col. 5, line 43 should read – "...or pick up the sounds desired..."

Col. 6, line 16 should read – "...just prior the tape 20 being re-recorded."

Signed and Sealed this
Thirteenth Day of November, 2012

David J. Kappos
*Director of the United States Patent and Trademark Office*